July 19, 1960  G. A. HEALIS  2,945,961
CURRENT BALANCING REACTORS FOR DIODES
Filed May 5, 1958  2 Sheets-Sheet 1
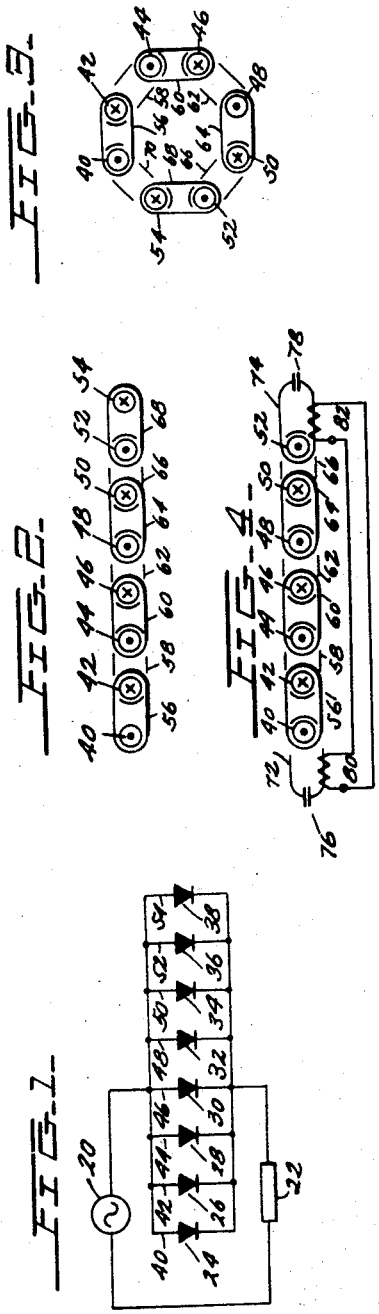
INVENTOR.
GEORGE A. HEALIS
BY
ATTORNEYS July 19, 1960 G. A. HEALIS 2,945,961
CURRENT BALANCING REACTORS FOR DIODES
Filed May 5, 1958 2 Sheets-Sheet 2

INVENTOR.
GEORGE A. HEALIS
BY
ATTORNEYS

United States Patent Office 2,945,961
Patented July 19, 1960

2,945,961
CURRENT BALANCING REACTORS FOR DIODES

George A. Healis, Palmyra, N.J., assignor to I-T-E Circuit Breaker Company, Philadelphia, Pa., a corporation of Pennsylvania Filed May 5, 1958, Ser. No. 732,868

13 Claims. (Cl. 307—58)

My invention relates to reactor construction for current balancing reactors and is an improvement of copending application Serial No. 628,324 filed December 14, 1956 entitled Current Balancing Reactors for Rectifier Elements in the name of I. K. Dortort and assigned to the assignee of the instant invention and copending application Serial No. 733,152 filed May 5, 1958 entitled Current Balancing Reactors for Diodes in the names of O. Jensen and I. K. Dortort and assigned to the assignee of the instant invention.

The above noted copending application Serial No. 628,324, describes a system for balancing the current between a plurality of parallel connected diodes by coupling each pair of adjacent diodes with a common reactor core. Since there may be as many as twenty or more parallel connected rectifiers to be coupled, it was found that the use of individual coupling reactors leads to an extremely complex and expensive system.

I have found that the plurality of individual coupling reactors can be replaced by a single stack of flat stamped magnetic laminations having apertures in registry with each of the diode conductors to be coupled where a first portion of the laminations of the stack couple a given diode conductor with a first adjacent diode and a second portion of the laminations couple the same diode with a second adjacent diode. In this manner, each pair of adjacent diodes of a parallel connected group will be coupled by a magnetic path in the same manner as if individual coupling reactors were used. Furthermore, by appropriately designing the laminations, an open or closed chain of coupling reactors can be formed.

I have further constructed the system so that the coupling iron is supported from the main current carrying bus work to thereby further amplify the mechanical structure of a rectifier system using a substantial number of diode elements.

Accordingly, a primary object of my invention is to provide a novel coupling reactor system.

Another object of my invention is to provide a current balancing system for parallel connected diodes which is simple and economical.

Another object of my invention is to form a coupling magnetic circuit for magnetically coupling a plurality of pairs of adjacent diodes which is formed from a stack of punched laminations.

Still another object of my invention is to provide a novel laminated sheet structure for the balancing reactors of a plurality of parallel connected diodes where the reactors are supported from the bus bars of the system.

These and other objects of my invention will become apparent from the following description when taken in conjunction with the drawings, in which:

Figure 1 shows a single phase half-wave rectifier having a plurality of parallel connected diode elements.

Figure 2 shows the manner in which the diodes of Figure 1 can be coupled by coupling reactors to force an equal current distribution between the diodes where the coupling chain is open.

Figure 3 is similar to Figure 2 where the chain of coupling reactors is closed.

Figure 4 shows another manner in which the chain of Figure 2 can be closed.

Figure 9 shows the manner in which the lamination stacks of Figure 8 can be supported from the bus structure in a partially cross-sectional view.

Figure 10 is a view of Figure 9 taken across the lines 10—10.

Figure 5:
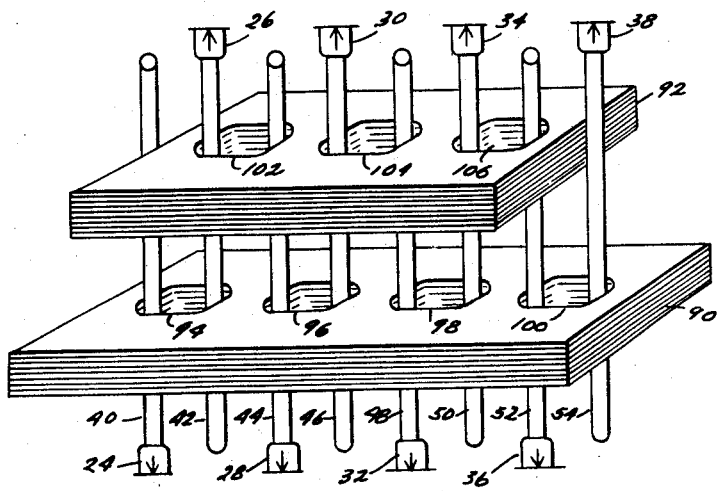
Figure 5 shows a perspective view of the manner in which a stack of stamped laminations may provide the same magnetic circuits as an open chain of coupling reactors.

Referring now to Figure 1, the single phase, half-wave rectifier is shown therein to merely illustrate how a plurality of diodes are connected in parallel to achieve a particular current rating of a system. Thus, a A.-C. source 20 is connected to a D.-C. load 22 through eight parallel connected diodes 24, 26, 28, 30, 32, 34, 36 and 38.

As is fully described in above noted copending application Serial No. 628,324, the forward current conducted by each of the diodes will be different in accordance with the forward conduction characteristic of each diode. Therefore, as seen in Figure 2, the conductors 40, 42, 44, 46, 48, 50, 52 and 54 associated with diodes 24, 26, 28, 30, 32, 34, 36 and 38 respectively are interconnected by coupling reactors which force equal current distribution between the diodes.

Hence, each adjacent pair of diode conductors are magnetically connected by coupling reactors 56, 58, 60, 62, 64, 66 and 68. More specifically, conductors 40 and 42 are linked by reactor 56, conductors 42 and 44 are linked by reactor 58, conductors 44 and 46 are linked by reactors 60 and so on. It is to be noted that the conductors of each pair are arranged to conduct current in opposite directions through their respective reactor, as indicated by the convention of a dot, indicating current flow away from the plane of the drawing and a cross indicating current flow into the plane of the drawing. Since the operation of the coupling reactors of the drawings is the subject matter of above noted application Serial No. 628,324, reference is made thereto for operational details.

While Figure 2 shows the so-called open chain type of coupling for forcing equal current distribution between the diodes 24–38 associated with conductors 40–54 respectively, the chain may be closed, as shown in Figure 3 by a further coupling reactor 70 which couples conductors 54 and 40.

If there are an odd number of parallel connected diodes rather than the even number of Figures 1, 2 and 3, the chain may be closed as in Figure 4 by providing auxiliary reactors 72 and 74 for conductors 40 and 52 respectively where each of auxiliary reactors 72 and 74 have air gaps 76 and 78 respectively and windings 80 and 82 respectively. The chain is closed by connecting the windings 80 and 82 together with the start of one, indicated by the dot connected to the finish of the other. It is to be noted that an open chain of an even number of diode conductors can be closed in the manner of Figure 4 where the starts of windings 80 and 82 are connected together. Clearly, many other types of closing a loop of even or odd numbers of diodes are available, the methods shown herein being for purposes of illustration.

Figure 5 shows a first embodiment of my invention where a stack of stamped laminations form an equivalent of an open chain of couplet reactors. Figure 5 shows the diode conductors 40 through 54 as being magnetically related through a stack of magnetic laminations having a first portion 90 and a second potrion 92. Each lamination of first portion 90 has openings 94, 96, 98 and 100 stamped therein where opening 94 receives conductors 40 and 42 in opposed current carrying relation and in a similar manner, openings 96, 98 and 100 receive pairs of diode conductors 44—46, 48—50, and 52—54 respectively. Each lamination of second portion 92 has openings 102, 104 and 106 therein which receive pairs of conductors 42—44, 46—48 and 50—52 respectively.

The first and second portions (shown exploded away from one another in Figure 5) therefore provide magnetic couplings identical to the individual coupling reactors of Figure 2. That is to say, the conductors are surrounded by magnetic material in the same manner as if individual reactors were used. Thus, conductor 42 is magnetically associated with its first adjacent conductor 40 through lamination portion 90 while it is also magnetically associated with its second adjacent conductor 44 through lamination portion 92. In a similar manner, each pair of adjacent diode conductors are linked to one another through a magnetic circuit.

Figure 8A:
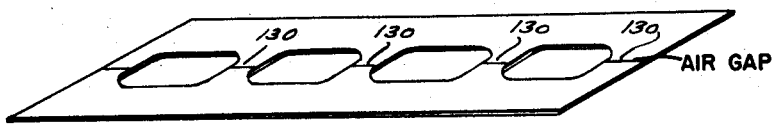
Figure 8a shows the manner in which an air gap may be inserted into the laminations of Figure 5.
Figure 6:
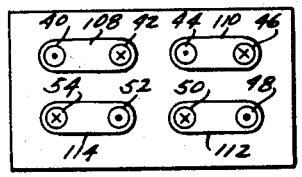
Figure 6 shows a top view of one of the laminations of a first group of laminations where the laminations are to form a closed chain.
Figure 7:
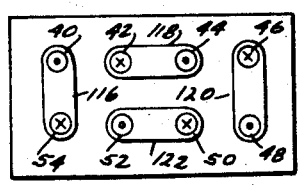
Figure 7 shows a top view of one of the laminations of a second group of laminations which are to form a closed chain.
Figure 8:
Figure 8 shows a top view of the lamination of Figure 6 positioned with respect to the lamination of Figure 7.

The manner in which an even number of diodes can be connected in a closed chain is shown in Figures 6, 7 and 8.

The first portion of the laminaiton stack is seen in the top view of Figure 6 as containing openings 108 through 114 while the second portion of the lamination stack of Figure 7 contains openings 116 through 122. As described in Figure 5, the openings of the first lamination portion of Figure 6 receives a first alternate pair of conductors while the openings of the second lamination portion of Figure 7 receives a second alternate pair of laminations.

Therefore, when the first and second lamination portions are positioned with respect to one another as in Figure 8, it is clear that each alternate pair of conductors are connected and the chain closes on itself as described in Figure 3.

In the event that the coupling reactors are to be air gaps for reasons set forth in the above noted copending application, then, as shown in Figure 8a for the case of the laminaitons of the type used in Figure 5, a longitudinal cut 130 can be made through some or each of the laminations.

The manner in which the laminations may be supported from the bus members is shown in Figures 9 and 10 for the case of the closed chain system of Figures 6, 7 and 8.

Referring now to Figures 9 and 10, the rectifier assembly is supoprted from a frame member 132 of insulating material. The frame 132 supports a first and second bus 134 and 136 which are bolted to frame 132 as by bolts 138 and 140 for bus 136 of Figure 9 and are positioned on nut plates 142, 144, 146 and 148. Buses 134 and 136 contain cooling conduits 135a—135b and 137a—137b respectively and support conductive diode receivng blocks such as blocks 150 through 156 for bus 136 and four similar blocks such as block 158 for bus 134.

Each of the diode receiving blocks are constructed as shown for block 158 of Figure 9 having tapped openings such as opening 160 for receiving their respective diode member, and being bolted to their nut plates by bolts similar to bolts 162 and 164.

The output bus is comprised of first and second elongated angle shaped members 166 and 168 which are positioned on and electrically connected by conductive bus 169 (Figure 9) and bolted to the frame 132 by bolts 172 and 174.

The current balancing reactor laminations are supported from the buses 166 and 168 by the diode conductors as will be shown hereinafter and are comprised of a first portion 170 corresponding to the laminations of Figure 6, and a second portion 172 corresponding to the laminations of Figure 7. The laminations are preferably insulated from the buses in any desired manner.

Since the pairs of adjacent conductors to be magnetically coupled must pass through the laminations in opposite directions, all of the diode conductors in which current is to pass from right to left, or diodes 24, 28, 32 and 36 (see Figure 5) are connected to bus 134 while the other diodes 26, 30, 34 and 38 are connected to bus 136. Therefore, each of diodes 24, 28, 32 and 36, as specifically shown for diode 36 in Figure 9, is connected through a respective current limiting fuse (fuse 176 for diode 36) and then to diode conductor 52 which is insulated from bus 168 and the laminations 170 and 172 by insulating sleeve 178 and insulating spacer 180 and the diode conductor then is electrically connected to bus 166. In a simliar manner, the remaining diodes 24, 28 and 32 of bus 134 are electrically connected to bus 166, passing through and being insulated from the bus 168 and cores 170 and 172 by insulating structure such as insulating sleeves 182, 184 and 186 respectively.

In a similar manner, diode 26 being typical of diodes 26, 30, 34 and 38 is electrically connected through fuse 188 to bus bar 168 after passing through the cores 170 and 172. Note that conductor 42 of diode 26 is electrically insulated from bus 166 and laminations 170 and 172 by insulating sleeve 190 and insulating spacer 192.

From the foregoing, it is apparent that the lamination structure is supported from bus bars 166 and 168 by conductors 40, 42, 44, 46, 48, 50, 52 and 54 which pass through the lamination structure and are fastened to the buses. Accordingly, the structure is made extremely compact, accessible for maintenance and economical.

In the foregoing, I have described my invention only in connection with preferred embodiments thereof. Many variations and modifications of the principles of my invention within the scope of the description herein are obvious. Accordingly, I prefer to be bound not by the specific disclosure herein but only by the appending claims.

I claim:

1. A current balancing reactor means for a plurality of parallel connected diodes; said current balancing reactor means comprising a stack of magnetic laminations; each of said diodes having conductors extending therefrom; each of said conductors being positioned adjacent another of said conductors; each of said conductors and a first of said conductors adjacent thereto extending through respective apertures in a first portion of said stack of magnetic laminations; each of said conductors and a second of said conductors adjacent thereto extending through respective apertures in a second portion of said stack of magnetic laminations; each of said conductors adjacent to one another carrying current in an opposite direction; each of said conductors terminating on a common bus conductor means; said current balancing stack of magnetic laminations being supported from said bus conductor means.

2. A current balancing reactor means for a plurality of parallel connected diodes; said current balancing reactor means comprising a stack of magnetic laminations; each of said diodes having conductors extending therefrom; each of said conductors being positioned adjacent another of said conductors; each of said conductors and a first of said conductors adjacent thereto extending through respective apertures in a first portion of said stack of magnetic laminations; each of said conductors and a second of said conductors adjacent thereto extending through respective apertures in a second portion of said stack of magnetic laminations; each of said conductors adjacent to one another carrying current in an opposite direction; each of said conductors terminating on a common bus conductor means; said current balancing stack of magnetic laminations being supported from said bus conductor means; said bus conductor means being comprised of a first and second portion positioned adjacent a first and second face of said stack of magnetic laminations; alternately positioned conductors of said conductors extending from said diodes passing current through said stack in a first direction terminating at said first bus portion; the other of said diode conductors passing current through said stack in a direction opposite said first direction terminating at said second bus portion.

3. A current balancing reactor means for a plurality of parallel connected diodes; said current balancing reactor means comprising a stack of magnetic laminations; each of said diodes having conductors extending therefrom; each of said conductors being positioned adjacent another of said conductors; said stack of magnetic laminations being comprised of a first and second portion; each of said first and second portions of said stack of magnetic laminations including a first and second row of apertures extending parallel to one another; each of said conductors and a first conductor adjacent thereto extending through a respective aperture of said first portion of said stack of laminations; each of said conductors and a second conductor adjacent thereto extending through a respective aperture of said second portion of said stack of magnetic laminations; each of said adjacent conductors carrying current in an opposite direction.

4. A current balancing reactor means for a plurality of parallel connected diodes; said current balancing reactor means comprising a stack of magnetic laminations; each of said diodes having conductors extending therefrom; each of said conductors being positioned adjacent another of said conductors; said stack of magnetic laminations being comprised of a first and second portion; each of said first and second portions of said stack of magnetic laminations including a first and second row of apertures extending parallel to one another; each of said conductors and a first conductor adjacent thereto extending through a respective aperture of said first portion of said stack of laminations; each of said conductors and a second conductor adjacent thereto extending through a respective aperture of said second portion of said stack of magnetic laminations; each of said adjacent conductors carrying current in an opposite direction; each of said conductors being magnetically coupled through said stack of magnetic laminations.

5. A current balancing reactor means for a plurality of parallel connected diodes; said current balancing reactor means comprising a stack of magnetic laminations; each of said diodes having conductors extending therefrom; each of said conductors being positioned adjacent another of said conductors; said stack of magnetic laminations being comprised of a first and second portion; each of said first and second portions of said stack of magnetic laminations including a first and second row of apertures extending parallel to one another; each of said conductors and a first conductor adjacent thereto extending through a respective aperture of said first portion of said stack of laminations; each of said conductors and a second conductor adjacent thereto extending through a respective aperture of said second portion of said stack of magnetic laminations; each of said adjacent conductors carrying current in an opposite direction; said stack of magnetic laminations operating as individual coupling reactors coupling said adjacent conductors to force equal current distribution between their respective diodes.

6. A current balancing reactor means for a plurality of parallel connected diodes; said current balancing reactor means comprising a stack of magnetic laminations; each of said diodes having conductors extending therefrom; each of said conductors being positioned adjacent another of said conductors; said stack of magnetic laminations being comprised of a first and second portion; each of said first and second portions of said stack of magnetic laminations including a first and second row of apertures extending parallel to one another; each of said conductors and a first conductor adjacent thereto extending through a respective aperture of said first portion of said stack of laminations; each of said conductors and a second conductor adjacent thereto extending through a respective aperture of said second portion of said stack of magnetic laminations; each of said adjacent conductors carrying current in an opposite direction; each of said apertures in said first and second portions of said stack being aligned to allow each of said conductors to pass straight through said stack of laminations.

7. A current balancing reactor means for a plurality of parallel connected diodes; said current balancing reactor means comprising a stack of magnetic laminations; each of said diodes having conductors extending therefrom; each of said conductors being positioned adjacent another of said conductors; said stack of magnetic laminations being comprised of a first and second portion; each of said first and second portions of said stack of magnetic laminations including a first and second row of apertures extending parallel to one another; each of said conductors and a first conductor adjacent thereto extending through a respective aperture of said first portion of said stack of laminations; each of said conductors and a second conductor adjacent thereto extending through a respective aperture of said second portion of said stack of magnetic laminations; each of said adjacent conductors carrying current in an opposite direction; said stack of magnetic laminations operating as individual coupling reactors coupling said adjacent conductors to force equal current distribution between their respective diodes; each of said apertures in said first and second portions of said stack being aligned to allow each of said conductors to pass straight through said stack of laminations.

8. A current balancing reactor means for a plurality of parallel connected diodes; said current balancing reactor means comprising a stack of magnetic laminations; each of said diodes having conductors extending therefrom; each of said conductors being positioned adjacent another of said conductors; said stack of magnetic laminations being comprised of a first and second portion; each of said first and second portions of said stack of magnetic laminations including a first and second row of apertures extending parallel to one another; each of said conductors and a first conductor adjacent thereto extending through a respective aperture of said first portion of said stack of laminations; each of said conductors and a second conductor adjacent thereto extending through a respective aperture of said second portion of said stack of magnetic laminations; each of said adjacent conductors carrying current in an opposite direction; each of said conductors terminating on a common bus conductor means; said stack of laminations being supported from said bus conductor means.

9. A current balancing reactor means for a plurality of parallel connected diodes; said current balancing reactor means comprising a stack of magnetic laminations; each of said diodes having conductors extending therefrom; each of said conductors being positioned adjacent another of said conductors; said stack of magnetic laminations being comprised of a first and second portion; each of said first and second portions of said stack of magnetic laminations including a first and second row of apertures extending parallel to one another; each of said conductors and a first conductor adjacent thereto extending through a respective aperture of said first portion of said stack of laminations; each of said conductors and a second conductor adjacent thereto extending through a respective aperture of said second portion of said stack of magnetic laminations; each of said adjacent conductors carrying current in an opposite direction; each of said conductors terminating on a common bus conductor means; said stack of laminations being supported from said bus conductor means; said bus conductor means being comprised of a first and second portion positioned adjacent a first and second face of said stack of magnetic laminations; alternately positioned of said conductors extending from said diodes passing current through said stack in a first direction terminating at said first bus portion; the other of said alternately positioned conductors passing current through said stack in a direction opposite said first direction terminating at said second bus portion.

10. A current balancing reactor means for a plurality of parallel connected diodes; said current balancing reactor means comprising a stack of magnetic laminations; each of said diodes having conductors extending therefrom; each of said conductors being positioned adjacent another of said conductors; said stack of magnetic laminations being comprised of a first and second portion; each of said first and second portions of said stack of magnetic laminations including a first and second row of apertures extending parallel to one another; each of said conductors and a first conductor adjacent thereto extending through a respective aperture of said first portion of said stack of laminations; each of said conductors and a second conductor adjacent thereto extending through a respective aperture of said second portion of said stack of magnetic laminations; each of said adjacent conductors carrying current in an opposite direction; said conductors being arranged to form a closed loop to thereby form a closed chain coupling system; each of said conductors terminating on a common bus conductor means; said stack of laminations being supported from said bus conductor means.

11. A current balancing reactor means for a plurality of parallel connected diodes; said current balancing reactor means comprising a stack of magnetic laminations; each of said diodes having conductors extending therefrom; each of said conductors being positioned adjacent another of said conductors; said stack of magnetic laminations being comprised of a first and second portion; each of said first and second portions of said stack of magnetic laminations including a first and second row of apertures extending parallel to one another; each of said conductors and a first conductor adjacent thereto extending through a respective aperture of said first portion of said stack of laminations; each of said conductors and a second conductor adjacent thereto extending through a respective aperture of said second portion of said stack of magnetic laminations; each of said adjacent conductors carrying current in an opposite direction; each of said apertures in said first and second portions of said stack being aligned to allow each of said conductors to pass straight through said stack of laminations; said conductors being arranged to form a closed loop to thereby form a closed chain coupling system; each of said conductors terminating on a common bus conductor means; said stack of laminations being supported from said bus conductor means.

12. A current balancing reactor means for a plurality of parallel connected circuits; said current balancing reactor means comprising a stack of magnetic laminations; each of said circuits having conductors extending therefrom; each of said conductors being positioned adjacent another of said conductors; each of said conductors and a first of said conductors adjacent thereto extending through respective apertures in a first portion of said stack of magnetic laminations; each of said conductors and a second of said conductors adjacent thereto extending through respective apertures in a second portion of said stack of magnetic laminations; each of said adjacent conductors carrying current in an opposite direction; each of said conductors terminating on a common bus conductor means; said current balancing stack of magnetic laminations being supported from said bus conductor means.

13. A current balancing reactor means for a plurality of parallel connected circuits; said current balancing reactor means comprising a stack of magnetic laminations; each of said circuits having conductors extending therefrom; each of said conductors being positioned adjacent another of said conductors; said stack of magnetic laminations being comprised of a first and second portion; each of said first and second portions of said stack of magnetic laminations including a first and second row of apertures extending parallel to one another; each of said conductors and a first conductor adjacent thereto extending through a respective aperture of said first portion of said stack of laminations; each of said conductors and a second conductor adjacent thereto extending through a respective aperture of said second portion of said stack of magnetic laminations; each of said adjacent conductors carrying current in an opposite direction; each of said conductors terminating on a common bus conductor means; said stack of laminations being supported from said bus conductor means; said bus conductor means being comprised of a first and second portion positioned adjacent a first and second face of said stack of magnetic laminations; alternately positioned circuit conductors passing current through said stack in a first direction terminating at said first bus portion; the other of said circuit conductors passing current through said stack in a direction opposite said first direction terminating at said second bus portion.

References Cited in the file of this patent
UNITED STATES PATENTS
2,224,755   Werner _____ Dec. 10, 1940